(12) United States Patent
Xiao et al.

(10) Patent No.: US 11,500,689 B2
(45) Date of Patent: Nov. 15, 2022

(54) COMMUNICATION METHOD AND APPARATUS

(71) Applicant: Huawei Technologies Co., Ltd., Shenzhen (CN)

(72) Inventors: Lu Xiao, Shenzhen (CN); Mingchang Wei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 144 days.

(21) Appl. No.: 16/999,860

(22) Filed: Aug. 21, 2020

(65) Prior Publication Data

US 2020/0387405 A1 Dec. 10, 2020

Related U.S. Application Data

(63) Continuation of application No. PCT/CN2018/077161, filed on Feb. 24, 2018.

(51) Int. Cl.
*G06F 15/173* (2006.01)
*G06F 12/10* (2016.01)
(Continued)

(52) U.S. Cl.
CPC ........ *G06F 9/5077* (2013.01); *G06F 9/45558* (2013.01); *G06F 12/10* (2013.01);
(Continued)

(58) Field of Classification Search
CPC .... G06F 9/5077; G06F 9/45558; G06F 12/10; G06F 15/17331; G06F 2009/45583
(Continued)

(56) References Cited

U.S. PATENT DOCUMENTS 7,281,030 B1 * 10/2007 Davis .................. H04L 67/1097
709/212
10,509,764 B1 * 12/2019 Izenberg ................. H04L 69/22
(Continued)

FOREIGN PATENT DOCUMENTS

CN 102136003 A 7/2011
CN 103384551 A 11/2013
(Continued)

OTHER PUBLICATIONS

Zhang, J., "MVAPI CH2 over Open Stack with SR-IOV: An Efficient Approach to Build HPC Clouds," 15th IEEE/ACM International Symposium on Cluster, Cloud and Grid Computing, May 4, 2015, pp. 71-80, XP033171728.

*Primary Examiner* — Christopher B Shin
(74) *Attorney, Agent, or Firm* — Conley Rose, P.C.

(57) ABSTRACT

A communication method includes monitoring, by a shared agent, shared memory, wherein the shared memory is used by a first application, wherein the first application runs on a virtual device, wherein the virtual device is located on a host, wherein the shared memory belongs to a part of memory of the host and does not belong to memory specified by the host for the virtual device, and wherein the shared agent is disposed on the host independent of the virtual device, determining, by the shared agent, whether data of the first application is written to the shared memory, reading, by the shared agent, the data from the shared memory and sending the data to a second application in response to the data of the first application is written to the shared memory, wherein the second application is a data sharing party specified by the first application.

22 Claims, 6 Drawing Sheets

(51) Int. Cl.
  *G06F 9/455* (2018.01)
  *G06F 9/50* (2006.01)
(52) U.S. Cl.
  CPC ............... *G06F 15/17331* (2013.01); *G06F 2009/45583* (2013.01)
(58) Field of Classification Search
  USPC ........................................................ 711/169
  See application file for complete search history.

(56) References Cited

U.S. PATENT DOCUMENTS

| | | | |
|---|---|---|---|
| 2008/0104337 A1* | 5/2008 | VelurEunni | G06F 9/544 710/22 |
| 2010/0083247 A1* | 4/2010 | Kanevsky | G06F 9/45558 718/1 |
| 2012/0221671 A1* | 8/2012 | Chen | G06F 9/544 709/213 |
| 2013/0179732 A1 | 7/2013 | Alanis et al. | |
| 2015/0046924 A1 | 2/2015 | Ports et al. | |
| 2015/0089009 A1* | 3/2015 | Tsirkin | G06F 12/1081 709/212 |
| 2015/0089010 A1* | 3/2015 | Tsirkin | G06F 12/126 709/212 |
| 2016/0239430 A1* | 8/2016 | Tsirkin | G06F 12/109 |
| 2016/0246631 A1* | 8/2016 | Tsirkin | G06F 9/45558 |
| 2017/0242764 A1* | 8/2017 | Antony | G06F 9/45558 |
| 2018/0004562 A1 | 1/2018 | Huntley et al. | |
| 2018/0239726 A1 | 8/2018 | Wang et al. | |
| 2018/0241809 A1* | 8/2018 | Gandhi | G06F 15/76 |
| 2019/0141041 A1* | 5/2019 | Bhabbur | H04L 63/20 |
| 2019/0179794 A1* | 6/2019 | Wei | G06F 16/183 |
| 2019/0370131 A1* | 12/2019 | Mishra | H04L 43/10 |

FOREIGN PATENT DOCUMENTS

| | | |
|---|---|---|
| CN | 103607428 A | 2/2014 |
| CN | 104216862 A | 12/2014 |
| CN | 105404597 A | 3/2016 |
| CN | 106598752 A | 4/2017 |
| CN | 107678835 A | 2/2018 |
| WO | 2017209856 A1 | 12/2017 |

\* cited by examiner

COMMUNICATION METHOD AND APPARATUS

CROSS-REFERENCE TO RELATED APPLICATION

This application is a continuation of International Patent Application No. PCT/CN2018/077161, filed on Feb. 24, 2018, the disclosure of which is hereby incorporated by reference in its entirety.

TECHNICAL FIELD

The present technology relates to the field of network communications, and in particular, to a communication method and apparatus in a cloud environment.

BACKGROUND

With rapid development of network virtualization technologies, increasingly more applications (APP) run on a virtual machine. To improve network communication efficiency, applications on hosts usually perform communication in a remote direct memory access (RDMA) manner. RDMA means that data is directly transferred to a memory of a computer using a network, and the data is quickly moved from one system to a memory of a remote system without imposing any impact on an operating system such that a delay problem of data processing at a host end during network transmission is resolved. When an application running on a virtual machine on a local host communicates with an application running on a virtual machine on a remote host, a virtual network segment needs to be configured on the local virtual machine and the remote virtual machine, and then is bridged to physical network interface cards for communication.

Currently, when applications running on virtual machines on hosts perform communication through RDMA, virtualization and data forwarding need to be performed for a plurality of times. As a result, steps required for performing data transmission are increased, high network overheads and a long delay are caused, and system efficiency is decreased.

SUMMARY

Embodiments of this application provide a communication method, to improve efficiency of data transmission between applications running on virtual machines.

According to a first aspect, this application provides a communication method. The method includes monitoring, by a first shared agent, first shared memory, where the first shared memory is used by a first application, the first application runs on a first virtual device, the first virtual device is located on a first host, the first shared memory belongs to a part of memory of the first host and does not belong to memory specified by the first host for the first virtual device, and the first shared agent independent of the first virtual device is disposed on the first host, and after determining that data of the first application is written to the first shared memory, reading, by the first shared agent, the data from the first shared memory, and sending the data to a second application, where the second application is a data sharing party specified by the first application. In this way, steps required for performing data transmission between applications on virtual devices are reduced, network overheads are reduced, a delay is shortened, and system efficiency is improved.

For the first aspect, in a possible implementation, the first application applies for the first shared memory, and obtains the allocated first shared memory, and the first application registers shared information of the first application with a sharing management center, where the shared information of the first application includes an identifier of the first application, an identifier of the data sharing party specified by the first application, and information about the first shared memory. In this way, when data is transmitted between applications, whether a related application has permission to share data can be checked in order to enhance system stability.

For the first aspect, in another possible implementation, before the reading, by the first shared agent, the data from the first shared memory, the first shared agent sends a query message to the sharing management center based on the identifier of the first application, and receives a query response message sent by the sharing management center, where the query response message indicates information about the data sharing party of the first application, and the information about the data sharing party includes an identifier of the second application, and the first shared agent performs, based on the identifier of the second application, the step of sending the data to the second application. In this method, system operating efficiency can be improved.

For the first aspect, in another possible implementation, the first shared agent sends the data to the second application in a RDMA manner. In this method, a data transmission speed can be increased, and system operating efficiency can be improved.

For the first aspect, in another possible implementation, the first application obtains a virtual address of the first shared memory, the first application translates a physical address of the first shared memory into an address of virtual memory of the first shared agent, and the first shared agent obtains the address of the virtual memory of the first shared agent. Correspondingly, the first application writes the data to the first shared memory according to the virtual address of the first shared memory, and the first shared agent monitors the first shared memory according to the address of the virtual memory of the first shared agent. In this method, the first shared agent may monitor the first shared memory, and may extract data when the data is written to the first shared memory, thereby improving system operating efficiency.

For the first aspect, in another possible implementation, the first application creates a ring buffer based on the first shared memory, the virtual address of the first shared memory is a virtual address of the ring buffer, and the physical address of the first shared memory is a physical address of the ring buffer. In this method, a shared memory may be used by a plurality of applications at the same time, thereby improving system operating efficiency.

For the first aspect, in another possible implementation, the first shared memory that the first application applies for may be in a form of a memory page, and may be huge page memory. In this method, system operating efficiency can be further improved.

For the first aspect, in another possible implementation, the first shared memory is divided with an equal size such that sizes of all areas obtained through division are the same. In this method, utilization of a shared memory can be improved, and system operating efficiency is improved.

According to a second aspect, this application provides a communication method. The method includes receiving, by a second shared agent, data from a first application, where second shared memory is used by a second application, the second application runs on a second virtual device, the second virtual device is located on a second host, the second shared memory belongs to a part of memory of the second host and does not belong to memory specified by the second host for the second virtual device, and the second shared agent independent of the second virtual device is disposed on the second host, and writing, by the second shared agent, the data to the second shared memory such that the second application obtains the data, where the first application and the second application are data sharing parties of each other. In this way, steps required for performing data transmission between applications on virtual devices are reduced, network overheads are reduced, a delay is shortened, and system efficiency is improved.

For the second aspect, in a possible implementation, the second application applies for the second shared memory, and obtains the allocated second shared memory, and the second application registers shared information of the second application with a sharing management center, where the shared information of the second application includes an identifier of the second application, an identifier of the data sharing party specified by the second application, and information about the second shared memory. In this way, when data is transmitted between applications, whether a related application has permission to share data can be checked in order to enhance system stability.

For the second aspect, in another possible implementation, before the writing, by the second shared agent, the data to the second shared memory, the second shared agent sends a query message to the sharing management center, to determine the identifier of the second application or the information about the second shared memory, and performs, based on the identifier of the second application or the information about the second shared memory, the step of writing the data to the second shared memory. In this method, system operating efficiency can be improved.

For the second aspect, in another possible implementation, the data received from the first application is sent by the first application in a RDMA manner. In this method, a data transmission speed can be increased, and system operating efficiency can be improved.

For the second aspect, in another possible implementation, the second application obtains a virtual address of the second shared memory, and the second application translates a physical address of the second shared memory into an address of virtual memory of the second shared agent, and provides the second shared agent with the virtual address of the second shared agent. Correspondingly, the second shared agent writes the received data to the second shared memory according to the address of the virtual memory of the shared agent. In this method, the second shared agent may write the received data to the second shared memory such that the second application obtains the data, thereby improving system efficiency.

For the second aspect, in another possible implementation, the second application creates a ring buffer based on the second shared memory, where the virtual address of the second shared memory is a virtual address of the ring buffer, and the physical address of the second shared memory is a physical address of the ring buffer. In this method, a shared memory may be used by a plurality of applications at the same time, thereby improving system operating efficiency.

According to a third aspect, this application provides a computer system. The computer system includes a first host and a first virtual device running on the first host, a first application runs on the first virtual device, first shared memory is allocated to the first application, and the first shared memory belongs to a part of memory of the first host and does not belong to memory specified by the first host for the first virtual device, and the computer system further includes a monitoring module, and the monitoring module is independent of the first virtual device, and is configured to monitor the first shared memory, and after determining that data of the first application is written to the first shared memory, read the data from the first shared memory, and send the data to a second application, where the second application is a data sharing party specified by the first application.

For the third aspect, in a possible implementation, the first application is configured to apply for the first shared memory, obtain the allocated first shared memory, and register shared information of the first application, where the shared information of the first application includes an identifier of the first application, an identifier of the data sharing party specified by the first application, and information about the first shared memory.

For the third aspect, in another possible implementation, before reading the data from the first shared memory, the monitoring module sends a query message to a sharing management center, and receives a query response message sent by the sharing management center, where the query response message indicates information about the data sharing party of the first application, and the information about the data sharing party includes an identifier of the second application, and the monitoring module performs, based on the identifier of the second application, the step of sending the data to the second application.

For the third aspect, in another possible implementation, the monitoring module sends the data to the second application in a RDMA manner.

For the third aspect, in another possible implementation, the first application is further configured to obtain a virtual address of the first shared memory, and translate a physical address of the first shared memory into an address of virtual memory of the monitoring module, where the monitoring module obtains the address of the virtual memory of the monitoring module. Correspondingly, the first application writes the data to the first shared memory according to the virtual address of the first shared memory, and the monitoring module monitors the first shared memory according to the address of the virtual memory of the monitoring module.

For the third aspect, in another possible implementation, the first application creates a ring buffer based on the first shared memory, the virtual address of the first shared memory is a virtual address of the ring buffer, and the physical address of the first shared memory is a physical address of the ring buffer.

According to a fourth aspect, this application provides a computer system. The computer system includes a second host and a second virtual device running on the second host, a second application runs on the second virtual device, second shared memory is allocated to the second application, and the second shared memory belongs to a part of memory of the second host and does not belong to memory specified by the second host for the second virtual device, and the computer system further includes a transmission module, and the transmission module is independent of the second virtual device, and is configured to receive data from a first application, and write the data to the second shared memory such that the second application obtains the data, where the first application is a data sharing party specified by the second application.

For the fourth aspect, in a possible implementation, the second application is configured to apply for the second shared memory, obtain the allocated second shared memory, and register shared information of the second application, where the shared information of the second application includes an identifier of the second application, an identifier of the data sharing party specified by the second application, and information about the second shared memory.

For the fourth aspect, in another possible implementation, the transmission module is further configured to send a query message to a sharing management center before writing the data to the second shared memory, to determine the identifier of the second application or the information about the second shared memory, and the transmission module performs, based on the identifier of the second application or the information about the second shared memory, the step of writing the data to the second shared memory.

For the fourth aspect, in another possible implementation, the data received from the first application is sent by the first application in a RDMA manner.

For the fourth aspect, in another possible implementation, the second application is further configured to obtain a virtual address of the second shared memory, and the second application translates a physical address of the second shared memory into an address of virtual memory of the transmission module, and provides the transmission module with the address of the virtual memory of the transmission module. Correspondingly, the transmission module is further configured to write the received data to the second shared memory according to the address of the virtual memory of the transmission module.

For the fourth aspect, in another possible implementation, the second application creates a ring buffer based on the second shared memory, the virtual address of the second shared memory is a virtual address of the ring buffer, and the physical address of the second shared memory is a physical address of the ring buffer.

According to a fifth aspect, a computer system is provided. The computer system includes a processor and a memory, where the memory stores program code, and the processor is configured to invoke the program code in the memory to perform the data transmission method according to the first aspect.

According to a sixth aspect, a computer system is provided. The computer system includes a processor and a memory, where the memory stores program code, and the processor is configured to invoke the program code in the memory to perform the data transmission method according to the second aspect.

According to a seventh aspect, a data transmission system is provided. The data transmission system includes at least two hosts. A first virtual device runs on a first host, a first application runs on the first virtual device, first shared memory is allocated to the first application, the first shared memory belongs to a part of memory of the first host and does not belong to memory specified by the first host for the first virtual device, and the first host further includes a first shared agent. A second virtual device runs on a second host, a second application runs on the second virtual device, second shared memory is allocated to the second application, the second shared memory belongs to a part of memory of the second host and does not belong to memory specified by the second host for the second virtual device, and the second host further includes a second shared agent. The second application is a data sharing party of the first application. The first shared agent is configured to monitor the first shared memory, and after monitoring and detecting that data of the first application is written to the first shared memory, read the data from the first application, and send the data to the second host. The second shared agent is configured to receive the data from the first application, and write the data to the second shared memory.

For the seventh aspect, in a possible implementation, the data transmission system further includes a sharing management center configured to receive a registration message from the first host, and obtain shared information that is of the first application and that is in the registration message, where the shared information of the first application includes an identifier of the first application, an identifier of a data sharing party specified by the first application, and information about the first shared memory. The sharing management center is configured to receive a query message from the first shared agent, query information about the data sharing party of the first application based on the identifier that is of the first application and that is carried in the query message of the first shared agent, and send a query response message to the first shared agent, where the query response message includes an identifier of the second application.

For the seventh aspect, in another possible implementation, the sharing management center in the data transmission system is further configured to receive a query message from the second shared agent, query the identifier of the second application or information about the second shared memory, and send a query response message to the second shared agent, where the query response message includes the identifier of the second application or the information about the second shared memory.

In the data transmission system, the first host is further configured to further perform the method according to the first aspect, and the second host is further configured to further perform the method according to the second aspect.

DESCRIPTION OF EMBODIMENTS

To make the objectives, technical solutions, and advantages of this application more understandable, the following provides detailed descriptions. The detailed descriptions provide various embodiments of a device and/or a process using block diagrams, flowcharts, and/or examples. These block diagrams, flowcharts, and/or examples include one or more functions and/or operations such that a person in the art may understand that each function and/or operation in the block diagrams, the flowcharts, and/or the examples may be performed independently and/or jointly using much hardware, software, and firmware, and/or any combination thereof.

An RDMA technology is generated to resolve a delay of data processing at a host end during network transmission. RDMA is used to directly transmit data from one host to a storage area of another host using a network, and quickly move the data from one system to a memory of another system without affecting an operating system of the system. In this way, a computing processing function of the system is less used. This eliminates overheads of external memory replication and context switching in order to free up memory bandwidth and a CPU cycle to improve application system performance.

Data transmission between hosts through RDMA is usually divided into four steps. In a first step, when an application executes an RDMA read or write request, no data replication is performed. When no kernel memory is required to participate, the RDMA request is sent from an application running in user space to a local network interface card. In a second step, the local network interface card reads buffered content, and transmits the buffered content to a remote network interface card using a network. In a third step, RDMA information transmitted on the network includes a destination virtual address, a memory key, and data itself. Request completion may be processed completely in the user space, or may be processed using the kernel memory in a case in which the application is asleep until a request arrives. In a fourth step, a destination network confirms the memory key, and directly writes the data to an application buffer.

Figure 1:
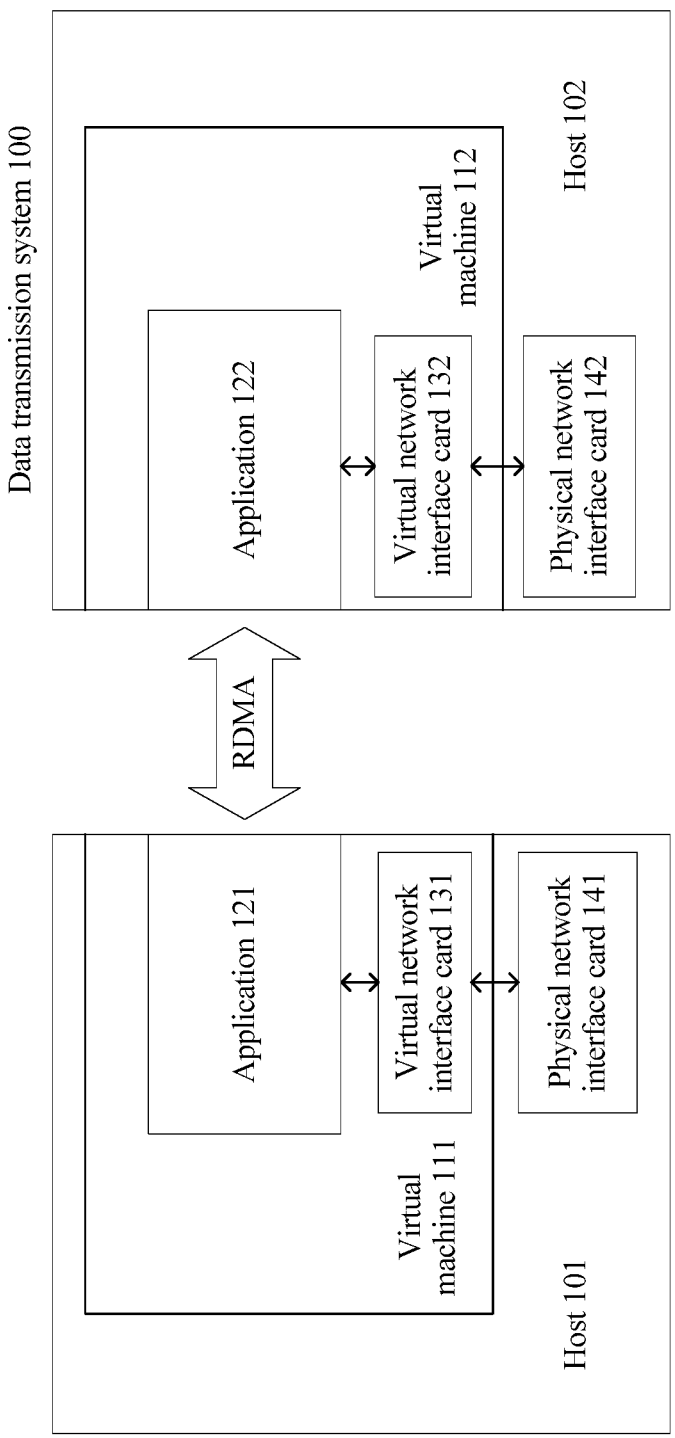
FIG. 1 is a schematic diagram of data transmission performed by applications running on different virtual machines in other approaches.

Data transmission using the RDMA technology may improve system efficiency and save processor resources. However, in other approaches, usually applications on two physical machines perform RDMA communication. In this case, as long as application information is registered with a physical network interface card, the applications may conveniently use physical network interface cards on the hosts to perform RDMA communication. However, if applications on two virtual machines communicate with each other, a step such as network virtualization needs to be added. As a result, system efficiency is reduced. FIG. 1 shows a process from another approach in which applications on virtual machines communicate with each other through RDMA. As shown in FIG. 1, a data transmission system 100 includes a host 101 and a host 102. A virtual machine 111 and a virtual machine 112 respectively run on the host 101 and the host 102. An application 121 and an application 122 respectively run on the virtual machine 111 and the virtual machine 112. When the application 121 needs to communicate with the application 122, the application 121 first sends data to a virtual network interface card 131 on the virtual machine 111, that is, sends the data from memory allocated by the host 101 to the application 121, to memory allocated to the virtual network interface card 131. Then, the virtual network interface card 131 sends the data to a physical network interface card 141 on the host 101 in a bridged forwarding manner. After receiving the data, the physical network interface card 141 sends the data to a physical network interface card 142 of the peer host 102 in an RDMA manner. The physical network interface card 142 forwards the data to a virtual network interface card 132 using a virtual bridge, and then the virtual network interface card 132 sends the data to the application 122 for processing. In this process, RDMA itself is a network interface card operation mode in which a processor occupies low overheads, but network forwarding generates high overheads. In addition, if there are a plurality of virtual machines on hosts, a virtual switch needs to be established to forward a data packet between a virtual network interface card and a physical network interface card, which causes a long delay. Therefore, this approach increases a network delay and network communication overheads during data transmission, and reduces system efficiency.

To improve RDMA transmission efficiency of an application on a virtual machine, this application provides a packet transmission method and a related apparatus. An application running on a virtual machine on a host applies for shared memory. After sending data to the shared memory, the application may directly send the data to a peer shared agent in an RDMA manner using a shared agent, and then the data is received by a peer application. The shared memory that the application applies for is different from memory of the virtual machine itself, and both the application and the shared agent can directly access the shared memory. Therefore, the shared data does not need to undergo a process in which network virtualization is performed for a plurality of times. The shared agent directly reads and sends the shared data to a peer end. Therefore, network overheads are reduced greatly, and system efficiency is improved, resolving problems of a long network delay and high network communication overheads caused during communication between applications on virtual machines.

Figure 2:
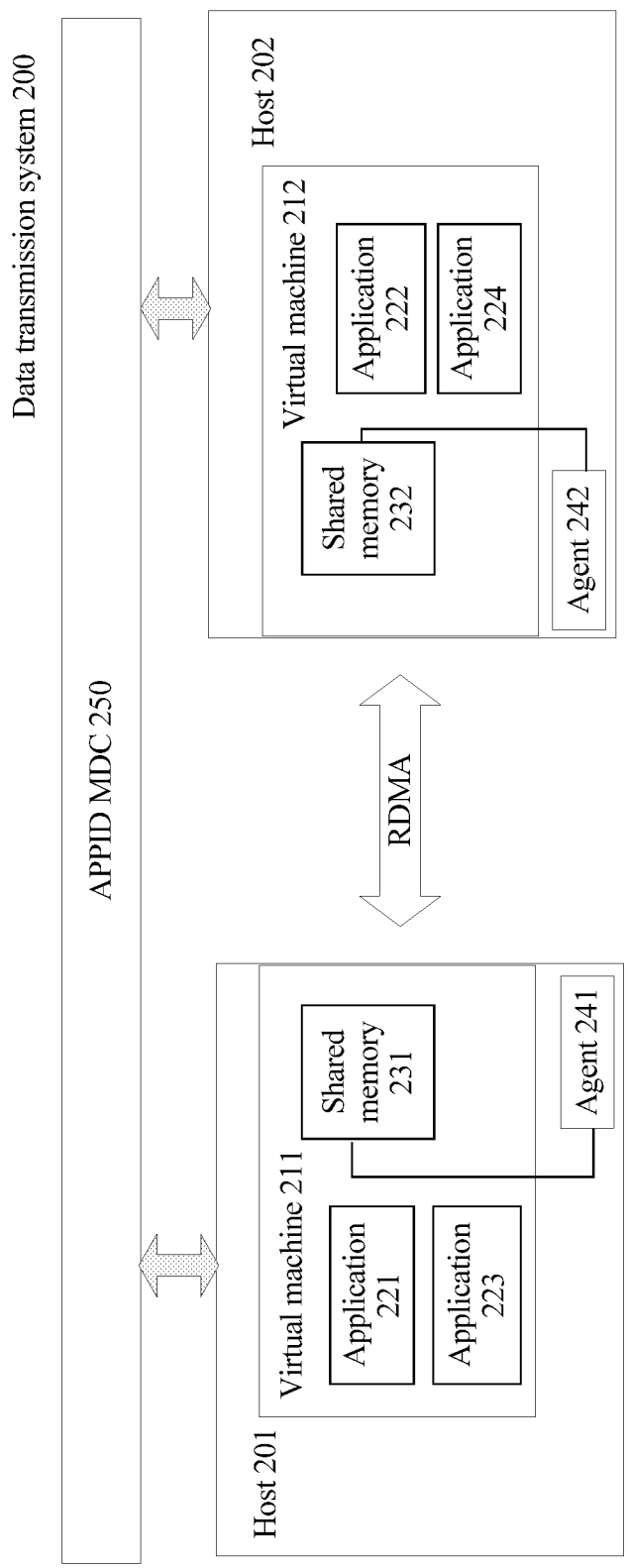
FIG. 2 is a schematic structural diagram of a data transmission system according to an embodiment of this application.

FIG. 2 is a system architecture diagram according to an embodiment of this application. As shown in FIG. 2, a data transmission system 200 includes at least two hosts a host 201 and a host 202. At least one virtual device separately runs on the host 201 and the host 202. The virtual device may be a virtual machine or a docker. The docker is an open-source application container engine that enables developers to packetize their applications and dependency packages to a portable docker, and then publish the applications and the dependency packages on a Linux machine, or implement virtualization. Compared with a conventional virtual machine technology, a docker technology has advantages such as a high start-up speed, high resource utilization, and low performance overheads. In embodiments of this application, a virtual machine is used as a virtual device for description. At least one application (two are shown in the figure) separately runs on a virtual machine 211 and a virtual machine 212 in the host 201 and the host 202. An application 221 is used as an example. The application 221 may invoke an application programming interface (API) interface of applying for memory to apply for shared memory 231 used for sharing. The shared memory 231 belongs to a part of memory of the host 201, but does not belong to memory specified by the host 201 for the virtual machine 211. When a specific condition is met, the shared memory 231 may be shared among different applications. A shared agent 241 independent of the virtual machine 211 is disposed on the host 201, and can detect, in a polling manner, whether data is written to the shared memory 231. For example, when detecting that data is written to the shared memory 231, the shared agent 241 extracts and parses the data, and then sends the data to an application at a receive end in a manner such as RDMA. To enable the shared agent 241 to read the data in the shared memory 231, the application 221 further translates a physical address of the shared memory 231 into an address of a virtual memory of the shared agent 241. The data transmission system 200 further includes an application identifier metadata center (APPID MDC) 250, which is used as a sharing management center of the system to determine whether there is permission to share data between applications. Usually, one data transmission system has one APPID MDC. The APPID MDC may be located at any location in the data transmission system, but it is necessary to ensure that information stored in the APPID MDC is accurate and is not tampered with.

Figure 3:
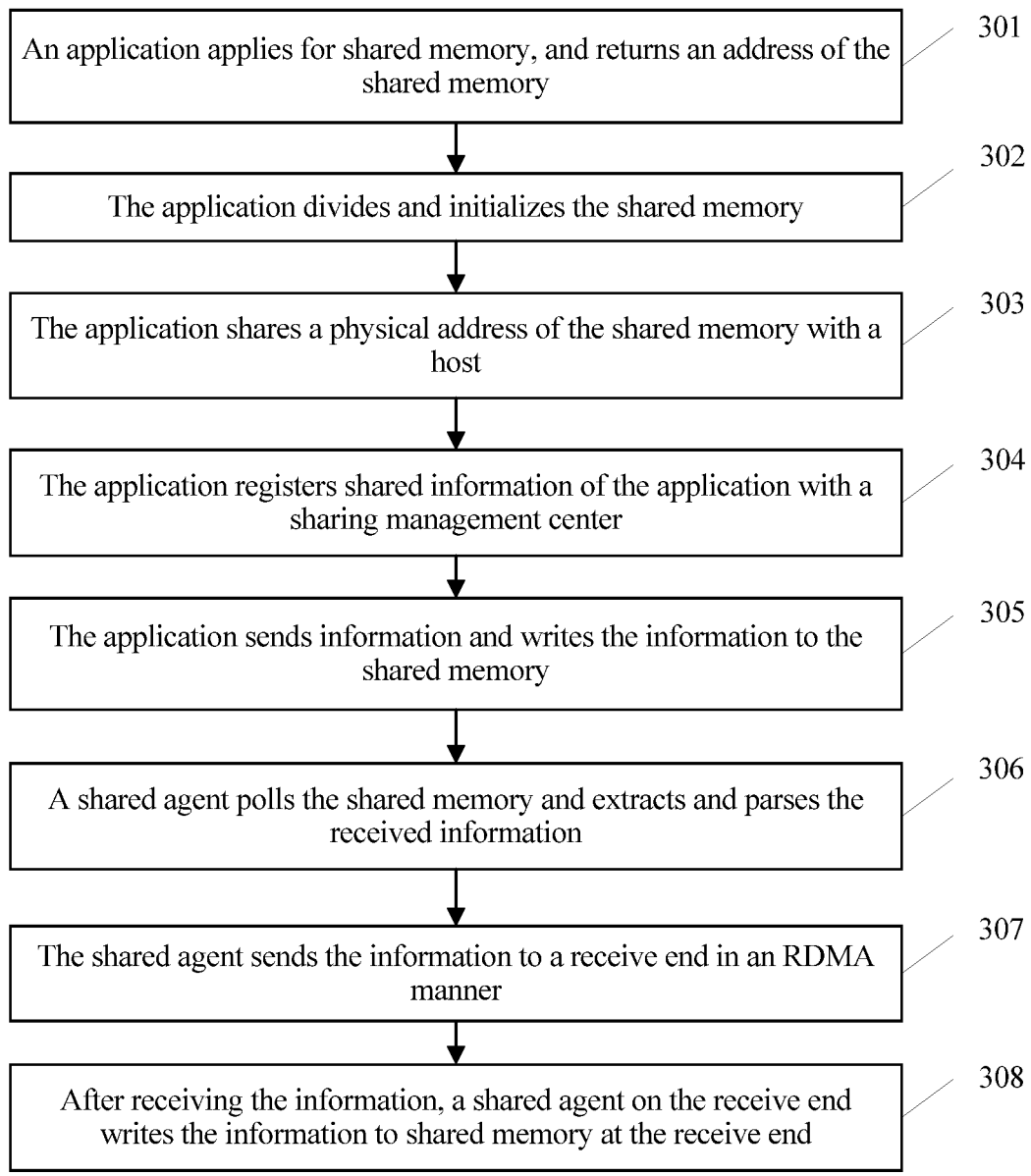
FIG. 3 is a schematic flowchart according to an embodiment of this application.

FIG. 3 is a flowchart according to an embodiment of this application. Details are as follows.

S301. An application 221 invokes an API interface of applying for memory to apply for shared memory 231, and returns a virtual address of a first address of the shared memory 231, and a physical address corresponding to the first address. The shared memory 231 that is applied for belongs to a part of memory of a host, but does not belong to memory specified by the host for a virtual device. An operation of invoking the API interface of applying for memory may be implemented in C language using alloc (name, size) code.

An application 222 applies for shared memory 232 with reference to the foregoing step, and returns a virtual address of a first address of the shared memory 232, and a physical address corresponding to the first address.

The virtual address means a method for indirectly accessing the physical address. According to this method, a memory address accessed by the application is no longer an actual physical address but a virtual address, and then an operating system maps the virtual address to an appropriate physical memory address.

To further improve efficiency, the memory that the application applies for may be in a form of a memory page. The memory page means that address space is divided into many pages. For a size of each page, a central processing unit (CPU) first determines several types of optional specifications, and then the operating system selects the size from several types of page sizes supported by the CPU. With the memory page, when a page is used during running of an application, memory is allocated to the page, and a page temporarily not used is stored on a hard disk. When these pages are used, memory is allocated to these pages in physical space, and then a mapping between a page in a virtual address and an allocated physical memory page is established. In this embodiment, a type of the memory page that the application applies for may be a huge page memory. A system process accesses memory using a virtual address, but a processor needs to translate the virtual address into a physical address to really access the memory. To improve translation efficiency, the processor buffers a latest mapping relationship between a virtual memory address and a physical memory address, and stores the mapping relationship in a mapping table maintained by the processor. To maximize a memory access speed, as many mapping relationships as possible need to be stored in the mapping table. In this case, when a size of the memory page is increased, entries of the mapping table can be reduced, and retrieval efficiency of the processor can be improved.

The shared memory that the application applies for may be in a lock-free ring buffer form. In this method, a plurality of producers and consumers can be dequeued and enqueued at the same time. In addition, a plurality of processes can share one piece of shared memory.

When there is a lock, context needs to be switched once by the operating system when the lock is added and released. Consequently, a relatively long delay is caused, and a thread waiting for the lock is suspended until the lock is released. In addition, during context switching, instructions and data previously buffered in the processor are invalid, resulting in a great performance loss. The lock further has some other disadvantages. When waiting for the lock, a thread cannot perform any operation. However, if a thread with a lock is delayed for execution, all threads that need the lock cannot be executed. When there is no lock, operations of writing data may be performed at the same time only when a plurality of processes or threads intend to write data to a buffer at the same time.

A difference between a ring queue and a common queue lies in that an element previous to the head of the ring queue is located at the tail of the queue in order to form a closed loop that accommodates a fixed quantity of elements. The ring queue provides an efficient mechanism for multi-thread data communication. The ring queue may support a plurality of processes or threads in sharing one buffer without waiting, and prevent the plurality of processes or threads from performing a read operation or a write operation at the same time so as to avoid causing a conflict.

When needing to use a lock-free ring buffer, another application sends a request to an application that creates the lock-free ring buffer. If the application that creates the lock-free ring buffer allows the other application to use the lock-free ring buffer, the application sends a physical address of the lock-free ring buffer to the application making the request such that the application making the request can use the buffer. In this embodiment, if an application 223 also needs to use the shared memory 231 that appears in the lock-free ring buffer form, the application 223 sends a request to the application 221. If the application 221 allows the application 223 to also use the shared memory 231, the application 221 sends the physical address, of the shared memory 231, in the memory of the host 201 to the application 223 such that the application 223 can use the shared memory 231.

The lock-free ring buffer may be implemented in two forms a linked list and an array. The linked list is a discontinuous and disordered storage structure on a physical storage unit. A logical sequence of data elements is implemented using a pointer link sequence in the linked list. The linked list includes a series of nodes. Each node includes two parts. One is a data domain that stores the data element, and the other is a pointer domain that stores a next node address. An advantage of a buffer in a linked list form lies in that when the linked list is used to construct a buffer, computer memory space can be fully used. A disadvantage is that the buffer in the linked list form is read at a relatively slow speed, because access to a linked list requires traversal of all linked lists one by one. The array is a data structure that includes a set of elements of a same type, and continuous memory is allocated for storage. An advantage of a buffer in an array form lies in that an access speed of the array is faster than that of the linked list, and at a hardware level, an element in the array may be preloaded by the processor to a cache line.

Further, when a plurality of application processes need to use same shared memory, a Data Plane Development Kit (DPDK) may be used such that virtual addresses corresponding to a physical address of the shared memory are the same in different application processes. This means that DPDK-based shared data within an application process, and pointers pointing to the shared data can be used universally in different processes.

S302. Divide the shared memory 231 and the shared memory 232 that are applied for in step S301, and initialize the shared memory 231 and the shared memory 232.

Optionally, the shared memory may be divided with an equal size such that sizes of all areas of the shared memory are the same. If the sizes of all the areas divided from the shared memory are different, when data is moved from a larger area to a smaller area, several smaller areas may need to be combined to store the data. In addition, when data is moved from a smaller area to a larger area, utilization of the larger area decreases. Therefore, equal-size division is performed on a memory page such that sizes of all areas of the buffer are the same, helping improve buffer utilization and improve operating efficiency of an entire system.

S303. The application 221 shares a physical address of the shared memory 231 with a host 201, and translates the physical address into an address of virtual memory of a shared agent 241 in a process of the host 201. In this way, the shared agent 241 in the host 201 may read data in the shared memory 231. Similarly, the application 222 shares a physical address of the shared memory 232 with a host 202, and translates the physical address into an address of virtual memory of a shared agent 242 in a process of the host 202.

S304. The application 221 registers shared information of the application 221 with a sharing management center, namely, an APPID MDC 250. The shared information of the application 221 includes an identifier of the application 221, an identifier of a data sharing party specified by the application 221, and information about the memory that the application 221 applies for. Usually, when a new application in a data transmission system 200 starts to run, the application registers shared information of the application with the sharing management center. In this way, the APPID MDC 250 stores shared information of applications running in the data transmission system 200, thereby improving security and stability of the entire system.

S305. The application 221 writes information to be sent to the application 222, to the shared memory 231. The to-be-sent information may include data shared by the application 221 with the application 222, the identifier of the application 221 itself, and an identifier of the application 222. Alternatively, the identifier of the application 221 itself, and the identifier of the application 222 may not be included in the to-be-sent information.

The to-be-sent information of the application 221 may further include the physical address of the shared memory 232 that the application 222 applies for, and the address, of the virtual memory of the shared agent 242 in the process of the host 202, corresponding to the physical address. In this way, in the following step S306, the shared agent 241 does not need to send the identifier of the application 222 to the APPID MDC 250, to query the physical address of the shared memory 232, and the address, of the virtual memory of the shared agent 242 in the process of the host 202, corresponding to the physical address.

S306. The shared agent 241 monitors the shared memory 231 in a polling manner, that is, detects, at intervals of a preset time, whether new information is written to a sending buffer 231. After discovering that new information is written to the sending buffer 231, the shared agent 241 extracts the information, and parses out the identifier of the application 221 at a transmit end and the identifier of the application 222 at a receive end from the extracted information.

The shared agent 241 may perform polling on the sending buffer 231 using a queue depth counter. Specifically, the queue depth counter is disposed in the sending buffer 231. Whenever new information is written to the sending buffer 231, a value of the queue depth counter increases by one. In this method, the shared agent 241 may detect, at intervals of the preset time, whether the value of the queue depth counter in the sending buffer 231 changes in order to determine whether new data is written to the sending buffer 231.

Optionally, the shared agent 241 sends the identifier of the application 221 at the transmit end and the identifier of the application 222 at the receive end to the sharing management center APPID MDC 250, and requests the APPID MDC 250 to determine whether there is information sharing permission, that is, whether the application 222 is a data sharer or a data sharing party specified by the application 221. The APPID MDC 250 determines, based on registration information of the application 221 stored in the APPID MDC 250, whether the application 221 has permission to share information with the application 222. If the application 221 has the permission, step S307 is then performed. If the application 221 does not have the permission, the shared agent 241 does not perform an operation of sending information, and returns error information.

If in step S305, the information sent by the application 221 does not include the identifier of the application 222, the shared agent 241 may send the identifier of the application 221 to the APPID MDC 250 for query, and receive a query response message sent by the APPID MDC 250. The query response message indicates information about the data sharing party of the application 221. The information about the data sharing party includes the identifier of the application 222.

If in step S305, the information sent by the application 221 does not include the physical address of the shared memory 232 that the application 222 applies for, or the address, of the virtual memory of the shared agent 242 in the process of the host 202, corresponding to the physical address, the shared agent 241 may send the identifier of the application 222 at the receive end to the APPID MDC 250, and request the APPID MDC 250 to notify the shared agent 241 of information about the shared memory 232 corresponding to the application 222. After receiving the request, the APPID MDC 250 queries a set of stored shared information, finds the information about the shared memory 232 that the application 222 applies for, and notifies the shared agent 241 of the information. The shared agent 241 may add the information about the shared memory 232 to the information sent by the application 221.

S307. The shared agent 241 sends, based on the identifier of the application 222 at the receive end, and network information of the host 202 on which the application 222 is located, the information from the application 221 to the shared agent 242 on the host 202 corresponding to the application 222. The information may be sent in an RDMA manner in order to increase a data transmission speed.

S308. After receiving the information, the shared agent 242 extracts the information, and writes, based on the identifier that is of the application 222 at the receive end and that is carried in the information, data included in the information to the shared memory 232 that the application 222 applies for such that the application 222 can extract and receive the data. After receiving the data, the application 222 processes the data correspondingly.

If the information received by the shared agent 242 does not carry the identifier of the application 222 at the receive end, the shared agent 242 may send a query message to the APPID MDC 250 before writing the data to the shared memory 232, to determine the identifier of the application 222 or the information about the shared memory 232, and then write the data to the shared memory 232 based on the identifier of the application 222 or the information about the shared memory 232.

The foregoing steps embody a process in which the application 221 serves as a transmit end and shares data with the application 222. The application 221 may alternatively serve as a receive end and receive data shared by the application 222, and for a process, refer to the foregoing steps.

It should be noted that numbers of S301 to S308 are only used for reference, and do not mean that in this embodiment of this application, the foregoing steps need to be performed in a specific order. For example, the operation in which the application registers the shared information of the application with the APPID MDC in S304 may be performed before the operation in which the application shares, with the host, the physical address of the memory that the application applies for, in S303.

Figure 4:
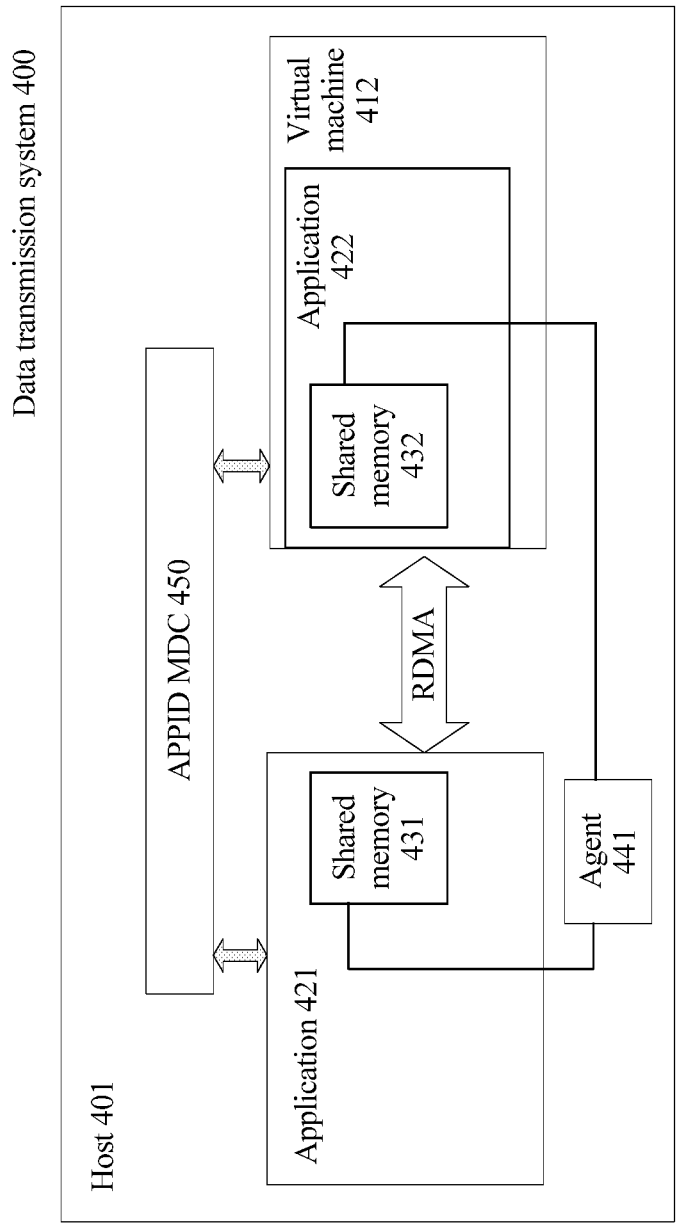
FIG. 4 is a schematic structural diagram of a data transmission system according to another embodiment of this application.

FIG. 4 is a system architecture diagram according to another embodiment of this application. As shown in FIG. 4, a data transmission system 400 includes a host 401. A shared agent 441 is further disposed on the host 401. The shared agent 441 monitors, in a polling manner, whether data is written to shared memory that an application applies for. The data transmission system 400 further includes a sharing management center APPID MDC 450 configured to determine whether there is permission to share data between applications.

In this embodiment, when an application 421 communicates with an application 422, because the two applications are located on the same host 401, regardless of whether the application 421 sends data to the application 422 or the application 422 sends data to the application 421, data sending is performed using the shared agent 441 on the host 401. For remaining steps in this embodiment, refer to the previous embodiment. Details are not described herein again.

Figure 5:
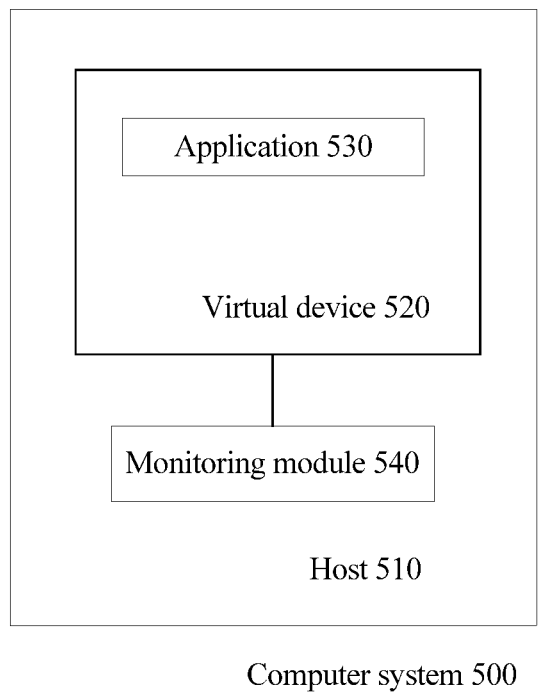
FIG. 5 is a schematic diagram of a functional structure of a computer system according to an embodiment of this application.

This application provides a computer system for implementing high-speed communication in a cloud environment application. As shown in FIG. 5, a computer system 500 includes a host 510 and a virtual device 520 running on the host 510. An application 530 runs on the virtual device 520. The computer system 500 further includes a monitoring module 540, and the monitoring module 540 is independent of the virtual device 520. The application 530 is configured to invoke an API interface of applying for memory to apply for shared memory used for sharing, and return a virtual address of a first address of the shared memory, and a physical address corresponding to the first address. The application 530 is further configured to share the physical address of the shared memory with the host 510, and translate the physical address into an address of virtual memory of the monitoring module 540 in a process of the host 500. When the application 530 needs to send data to a peer application, the application 530 writes the to-be-sent data into the shared memory that is applied for.

The monitoring module 540 is configured to monitor the shared memory that the application 530 applies for. For example, whether new information is written to the memory may be detected in a polling manner. When determining that new information is written to the shared memory that the application 530 applies for, the monitoring module 540 extracts and parses the information, and sends the information to an application at a receive end in a manner such as RDMA.

The application 530 is further configured to register shared information of the application 530. The shared information includes an identifier of the application 530, an identifier of a data sharing party specified by the application 530, and information about the shared memory that the application 530 applies for.

For implementation of a function of the computer system 500 provided in this embodiment of this application, refer to the data transmission method shown in FIG. 3.

Figure 6:
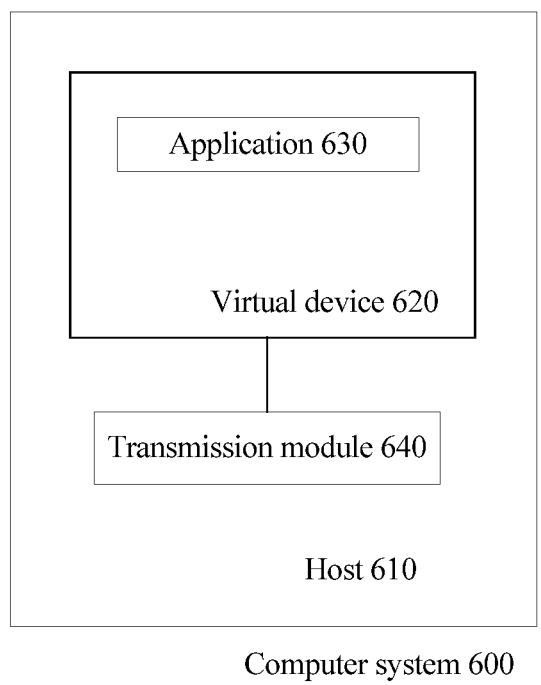
FIG. 6 is a schematic diagram of a functional structure of another computer system according to an embodiment of this application.

This application further provides a computer system 600 for implementing high-speed communication in a cloud environment application. As shown in FIG. 6, the computer system 600 includes a host 610 and a virtual device 620 running on the host 610. An application 630 runs on the virtual device 620. The computer system 600 further includes a transmission module 640, and the transmission module 640 is independent of the virtual device 620.

The application 630 is configured to invoke an API interface of applying for memory to apply for shared memory used for sharing, and return a virtual address of a first address of the shared memory, and a physical address corresponding to the first address. The application 630 is further configured to share the physical address of the shared memory with the host 610, and translate the physical address into an address of virtual memory of the transmission module 640 in a process of the host 610.

The transmission module 640 is configured to receive data from a peer application, and write the received data to the shared memory that the application 630 applies for such that the application 630 obtains the data.

The application 630 is further configured to register shared information of the application 630. The shared information includes an identifier of the application 630, an identifier of a data sharing party specified by the application 630, and information about the shared memory that the application 630 applies for.

For implementation of a function of the computer system 600 provided in this embodiment of this application, refer to the data transmission method shown in FIG. 3.

Figure 7:
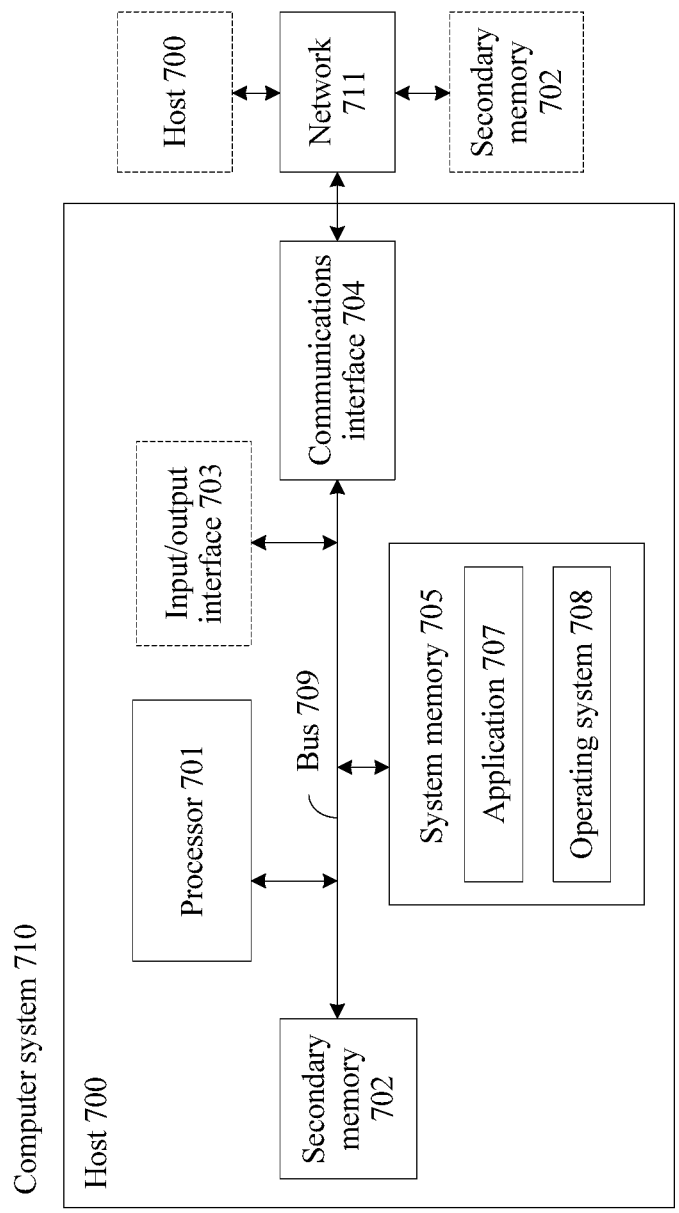
FIG. 7 is a schematic structural diagram of a computer system according to an embodiment of this application.

FIG. 7 is a schematic structural diagram of a computer system 710 according to an embodiment of this application.

As shown in FIG. 7, the computer system 710 includes a host 700. The host 700 includes a processor 701, and the processor 701 connects to system memory 705. The processor 701 may be computing logic such as a CPU, a graphics processing unit (GPU), a field-programmable gate array (FPGA), or a digital signal processor (DSP), or any combination of the foregoing computing logic. The processor 601 may be a single-core processor or a multi-core processor.

A bus 709 is configured to transmit information between components of the host 700. The bus 709 may use a wired connection manner or a wireless connection manner. This is not limited in this application. The bus 709 may further connect to a secondary storage 702, an input/output interface 703, and a communications interface 704.

The secondary storage 702 is usually referred to as an external memory. A storage medium of the secondary storage 702 may be a magnetic medium (such as a floppy disk, a hard disk, or a magnetic tape), an optical medium (such as an optical disc), a semiconductor medium (such as a solid-state disk (SSD)), or the like. In some embodiments, the secondary storage 702 may further include a remote memory separate from the processor 701, for example, a network disk (including a network or cluster file system such as a Network File System (NFS)) accessed using the communications interface 704 and a network 711.

The input/output interface 703 connects to an input/output device, and is configured to receive input information and output an operation result. The input/output device may be a mouse, a keyboard, a display, a compact disc-read only memory (CD-ROM) drive, or the like.

The communications interface 704 uses, for example but not limited to, a type of transceiver apparatus such as a transceiver, to communicate with another device or the network 711. The communications interface 704 and the network 711 may be interconnected in a wired or wireless manner.

Some features of this embodiment of this application may be implemented/supported by the processor 701 by executing software code in the system memory 705. The system memory 705 may include some software, for example, an operating system 708 (such as Darwin, RTXC, LINUX, UNIX, OS X, WINDOWS, or an embedded operating system (such as VXWORKS)), an application 707, and the like.

In addition, FIG. 7 is merely an example of the computer system 710. The computer system 710 may include more or fewer components than those shown in FIG. 7, or have different component configuration manners. In addition, various components shown in FIG. 7 may be implemented using hardware, software, or a combination of hardware and software.

The invention claimed is:

1. A method comprising:
monitoring, by a shared agent, a shared memory according to an address that is of a virtual memory of the shared agent and that corresponds to a physical address of the shared memory, wherein the shared memory is used by a first application of a virtual device on a host, wherein the shared memory belongs to a part of a memory of the host that is not dedicated by the host to the virtual device, and wherein the shared agent is disposed on the host independent of the virtual device;
determining, by the shared agent, whether data of the first application have been written to the shared memory;
reading, by the shared agent, the data from the shared memory after the data have been written, to the shared memory; and
sending the data to a second application,
wherein the second application is a data sharing party specified by the first application.

2. The method of claim 1, further comprising:
applying, by the first application, for the shared memory;
obtaining, by the first application, the shared memory; and
registering, by the first application, shared information of the first application with a sharing management center, wherein the shared information comprises a first identifier of the first application, a second identifier of the data sharing party, and information about the shared memory.

3. The method of claim 2, wherein before reading the data from the shared memory, the method further comprises:
sending, by the shared agent, a query message to the sharing management center based on the first identifier;
receiving, by the shared agent, a query response message from the sharing management center, wherein the query response message indicates information about the data sharing party, and wherein the information about the data sharing party comprises a third identifier of the second application; and
sending, by the shared agent, the data to the second application based on the third identifier.

4. The method of claim 1, wherein sending the data to the second application comprises sending, by the shared agent, the data to the second application in a remote direct memory access manner.

5. The method of claim 1, further comprising:
obtaining, by the first application, a virtual address of the shared memory;
translating, by the first application, the physical address into the address;
obtaining, by the shared agent, the address; and
writing, by the first application, the data to the shared memory according to the virtual address.

6. The method of claim 5, further comprising creating, by the first application, a ring buffer based on the shared memory, wherein the virtual address is of the ring buffer, and wherein the physical address is of the ring buffer.

7. A method comprising:
receiving, by a shared agent, data from a first application; and
writing, by the shared agent according to an address, the data to a shared memory to enable a second application to obtain the data,
wherein the address is of a virtual memory of the shared agent and corresponds to a physical address of the shared memory,
wherein the shared memory is used by the second application,
wherein the second application runs on a virtual device,
wherein the virtual device is located on a host,
wherein the shared memory belongs to a part of memory of the host and does not belong to a memory specified by the host for the virtual device,
wherein the shared agent is independent of the virtual device and is disposed on the host, and
wherein the first application is a data sharing party specified by the second application.

8. The method of claim 7, further comprising:
applying, by the second application, for the shared memory;
obtaining, by the second application, the shared memory; and
registering, by the second application, shared information of the second application with a sharing management center, wherein the shared information comprises a first identifier of the second application, a second identifier of the data sharing party specified by the second application, and information about the shared memory.

9. The method of claim 8, wherein before writing, by the shared agent, the data to the shared memory, the method further comprises sending, by the shared agent, a query message to the sharing management center to determine the first identifier or the information about the shared memory.

10. The method of claim 7, wherein receiving the data from the first application comprises receiving the data from the first application in a remote direct memory access manner.

11. The method of claim 7, further comprising:
obtaining, by the second application, a virtual address of the shared memory;
translating, by the second application, the physical address into the address; and
providing the shared agent with the address.

12. The method of claim 11, further comprising creating, by the second application, a ring buffer based on the shared memory, wherein the virtual address is of the ring buffer, and wherein the physical address is of the ring buffer.

13. A data transmission system comprising:
a first host comprising:
a first virtual device that runs on the first host;
a first application that runs on the first virtual device;
a first memory comprising a first shared memory, wherein the first shared memory is allocated to the first application and does not belong to memory specified by the first host for the first virtual device; and a first shared agent configured to:
monitor the first shared memory;
detect that data of the first application is written to the first shared memory; and
read the data from the first shared memory after monitoring and detecting that the data of the first application is written to the first shared memory; and
send the data; and a second host comprising:
a second virtual device that runs on the second host;
a second application that runs on the second virtual device and is a data sharing party of the first application;
a second memory comprising a second shared memory that is allocated to the second application, wherein the second shared memory does not belong to memory specified by the second host for the second virtual device; and
a second shared agent configured to:
receive the data from the first application; and
write the data to the second shared memory.

14. The data transmission system of claim 13, further comprising a sharing management center coupled to the first host and the second host and configured to:
receive a registration message from the first host;
obtain shared information that is of the first application and that is in the registration message, wherein the shared information comprises a first identifier of the first application, a second identifier of the data sharing party, and information about the first shared memory;
receive a first query message from the first shared agent, wherein the first query message carries the first identifier;
query information about the data sharing party based on the first identifier; and
send a query response message to the first shared agent, wherein the query response message comprises a third identifier of the second application.

15. The data transmission system of claim 14, wherein the sharing management center is further configured to:
receive a second query message from the second shared agent;
query the third identifier or information about the second shared memory; and
send a query response message to the second shared agent, wherein the query response message comprises the third identifier or the information about the second shared memory.

16. The data transmission system of claim 13, wherein the first shared agent comprises first virtual memory, wherein the first application is configured to:
obtain a virtual address of the first shared memory;
translate a first physical address of the first shared memory into an address of the first virtual memory; and
write the data to the first shared memory according to the virtual address, and
wherein the first shared agent is further configured to:
obtain the address of the first virtual memory; and
monitor the first shared memory according to the address of the first virtual memory.

17. The data transmission system of claim 13, wherein the second shared agent comprises second virtual memory, wherein the second application is configured to:
obtain a virtual address of the second shared memory;
translate a second physical address of the second shared memory into an address of the second virtual memory; and
provide the second shared agent with the address of the second virtual memory,
wherein the second shared agent is further configured to write the data to the second shared memory according to the address of the second virtual memory.

18. The data transmission system of claim 16, wherein the first application is further configured to create a ring buffer based on the first shared memory, wherein the virtual address is a virtual address of the ring buffer, and wherein the first physical address is a third physical address of the ring buffer.

19. The data transmission system of claim 17, wherein the second application is further configured to create a ring buffer based on the second shared memory, wherein the virtual address of the second shared memory is a virtual address of the ring buffer, and wherein the second physical address is a third physical address of the ring buffer.

20. The data transmission system of claim 13, wherein the first shared agent is further configured to send the data to the second application in a remote direct memory access manner.

21. The method of claim 1, further comprising directly accessing, by the shared agent, the shared memory.

22. The method of claim 7, further comprising directly accessing, by the shared agent, the shared memory.

* * * * *